US010320720B2

(12) United States Patent
Liu (10) Patent No.: US 10,320,720 B2
(45) Date of Patent: Jun. 11, 2019

(54) METHOD AND DEVICE FOR PROVIDING USER INFORMATION IN AN INSTANT MESSAGING APPLICATION

(71) Applicant: ALIBABA GROUP HOLDING LIMITED, George Town, Grand Cayman (KY)

(72) Inventor: Shuyan Liu, Zhejiang (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/520,833

(22) PCT Filed: Oct. 10, 2015

(86) PCT No.: PCT/CN2015/091695
§ 371 (c)(1),
(2) Date: Apr. 20, 2017

(87) PCT Pub. No.: WO2016/062205
PCT Pub. Date: Apr. 28, 2016

(65) Prior Publication Data
US 2017/0317955 A1    Nov. 2, 2017

(30) Foreign Application Priority Data
Oct. 20, 2014    (CN) .......................... 2014 1 0559409

(51) Int. Cl.
*G06F 15/16*    (2006.01)
*H04L 12/58*    (2006.01)

(52) U.S. Cl.
CPC ............. *H04L 51/04* (2013.01); *H04L 51/046* (2013.01); *H04L 51/08* (2013.01); *H04L 51/32* (2013.01)

(58) Field of Classification Search
CPC ....... H04L 51/04; H04L 51/046; H04L 51/08; H04L 51/32
(Continued)

(56) References Cited

U.S. PATENT DOCUMENTS

| 2009/0299785 A1 | 12/2009 | Savjani et al. | |
|---|---|---|---|
| 2013/0185368 A1* | 7/2013 | Nordstrom | H04W 4/21 709/206 |
| 2013/0262588 A1* | 10/2013 | Barak | H04L 67/22 709/204 |

FOREIGN PATENT DOCUMENTS

| CN | 101616503 A | 12/2009 |
|---|---|---|
| CN | 102801691 A | 11/2012 |

(Continued)

OTHER PUBLICATIONS

PCT International Search Report dated Jan. 13, 2016, issued in corresponding International Application No. PCT/CN2015/091695 (4 pages).
(Continued)

*Primary Examiner* — Phuoc H Nguyen
(74) *Attorney, Agent, or Firm* — Finnegan, Henderson, Farabow, Garrett & Dunner, LLP (57) ABSTRACT

Embodiments of the disclosure provide methods and devices for providing user information in an instant messaging application. The method may include: receiving a request of searching for a target user sent by an initiator user, the request carrying character feature description information of the target user provided by the initiator user; forwarding the request to a designated recipient user client terminal, and notifying a server of an event that the request has been initiated, so that the server monitors and records a forwarding situation of the request, wherein at least one forwarding path is formed after the request is forwarded, each forwarding path comprises at least two nodes, each of the nodes corresponds to one user, users on adjacent nodes are in a preset relationship, and a starting node corresponds to the initiator user; the forwarding situation comprises user identifiers corresponding to the nodes in the paths and processing mode information of the request; and when a processing
(Continued)

mode of a user on one forwarding path is responding to the request, determining the user as a target node of the forwarding path; and receiving contact information of the user of the target node provided by the server, so as to display the contact information to the initiator user.

33 Claims, 6 Drawing Sheets

(58) Field of Classification Search
    USPC .................................................. 709/206, 227
    See application file for complete search history.

(56)             References Cited

FOREIGN PATENT DOCUMENTS

| CN | 102868716 A | 1/2013 |
|----|-------------|--------|
| CN | 102957778 A | 3/2013 |
| CN | 103516581 A | 1/2014 |
| WO | WO 2008/150891 A1 | 12/2008 |
| WO | WO2008150891 | 12/2008 |
| WO | WO2009123983 | 10/2009 |
| WO | WO2014162053 | 10/2014 |

OTHER PUBLICATIONS

First Search Report issued in PCT International Application No. 2014/105594097 (1 pg.).

Supplemental Search Report issued in PCT International Application No. 2014/105594097 (1 pg.).

Second Office Action dated Aug. 27, 2018, issued by the State Intellectual Property Office of the People's Republic of China in counterpart Chinese Patent Application No. 201410559409.7 (28 pgs.).

* cited by examiner

METHOD AND DEVICE FOR PROVIDING USER INFORMATION IN AN INSTANT MESSAGING APPLICATION

CROSS REFERENCE TO RELATED APPLICATION

This application claims priority to International Application No. PCT/CN2015/091695, filed Oct. 10, 2015, which is based on and claims the benefits of priority to Chinese Application No. 201410559409.7, filed Oct. 20, 2014, both of which are incorporated herein by reference in their entireties.

TECHNICAL FIELD

The present application relates to the technical field of instant messaging, and in particular, to a method and a device for providing user information in an instant messaging application.

BACKGROUND

The evolution of economic and social environments has caused interpersonal communication to be more important. Constantly associating with and communicating with all kinds of personnel can enrich and develop people themselves. Traditional social means can no longer meet people's demands. Internet social network has attracted a great amount of attention and been used by an increasing number of people, as the Internet social network is not limited by space and time and can establish connections among colleagues, classmates, and friends more easily.

The birth of instant messaging (IM) software makes these advantages of the Internet social network more prominent. People can easily and conveniently contact anyone in his/her own friend circle through the software. When needing to find a target user, a person can directly contact him/her if the target user is already in that person's friend circle.

However, as people are restricted by working and living environments, people's social network also has certain restrictions. When a certain target user to be found is someone who can be reached in daily life, it is relatively easy to find the target user within or relatively close to our social circles. However, in daily life, there may be some situations as below. For example, some target users that a person wants to find are not within our normal social circles, and therefore it may be difficult to find the target users by existing instant messaging software. A person can ask friends in a friend circle of the instant messaging software that whether their social networks have the target users to be found. It would be good if a user to be found is a friend of our direct friend, and we can ask our direct friend to provide information of the user to us. However, what if the users to be found are not the friends of direct friends? Although the person can still ask friends of friends to continue asking around in their friend circles, even if the target users can be found at last, information of the target users has to be finally returned to the person who initially sends the request through many links such as our friends, even friends of the friends, and the like. It is thus clear that, in this process, it has to occupy lots of user resources and system resources, and once a certain user forgets to return the information or does not return the information on time during the process, the initial user cannot timely obtain the information of the target users, or even cannot obtain the information at all.

In summary, how to help a user find any user that he/she wants to find more easily and conveniently becomes an urgent technical problem to be solved by those skilled in the art.

SUMMARY

The present application provides a method and a device for providing user information in an instant messaging application, which can reduce the workload of users of intermediate nodes, reduce waste of system resources, and enable an initiator user to be notified of a search result more timely and more reliably.

BRIEF DESCRIPTION OF THE DRAWINGS

To describe the technical solutions in the embodiments of the present disclosure or the prior art more clearly, the accompanying drawings required for illustrating the embodiments will be introduced briefly below. Apparently, the drawings in the following description are only some embodiments of the present disclosure, and those of ordinary skill in the art may further obtain other drawings according to these accompanying drawings without inventive efforts.

DETAILED DESCRIPTION

The technical solutions in the embodiments of the present disclosure will be described below clearly and completely with reference to the accompanying drawings in the embodiments of the present disclosure. Apparently, the described embodiments are only some of the embodiments rather than all of the embodiments of the present disclosure. All other embodiments obtained by those of ordinary skill in the art based on the embodiments in the present application shall fall within the protection scope of the present application.

In the embodiments of the present disclosure, a method for providing user information in an instant messaging application is provided based on a theory of "six degrees of separation". The so-called theory of "six degrees of separation" refers to that one person and any stranger may be separated by an interval of not more than five persons. That is, any stranger can be known via at most five intermediates. In the method, if one user wants to look for another user and the two users are not in a friend relationship and even do not know each other, a message can be edited in the instant messaging application, in which character feature description information of a target user that the user is looking for is specified. For example, the message may include "I am looking for an editor-in-chief of any fashion media in Hangzhou area." And the message is sent to his/her friend users, then his/her friend users may receive a corresponding prompt. The friend users may forward the message to several of their friends who they believe are the closest to the answer until the person meeting the requirement finally says "I am the one you are looking for." Therefore, the system may identify the user as the target user to be found, and establish an association between the user sending the request of looking for someone and the target user, enabling them to communicate with each other. In other words, in the embodiments of the present disclosure, the request of looking for someone can also be forwarded via friends of friends. However, after the target user is found, the system can automatically establish communication with the target user, and users that the request pass through do not need to return the message step-by-step, thus saving the overhead of the users and system resources.

During implementations, the technical solutions provided in the embodiments of the present disclosure can be finally implemented by mutual cooperation among an initiator user client terminal, a recipient client terminal, and a server. All client terminals receiving the request can be referred to as recipient client terminals, but the request received by a recipient client terminal may be from the initiator user client terminal, or may be from an upper-level recipient client terminal of the recipient client terminal. Generally, it can be understood that both the initiator user client terminal and the recipient client terminal are defined according to their functions in one request processing flow. In actual applications, an instant application installed on a user terminal device can implement the function of an initiator and can also implement the function of a recipient. In different processing flows, the same user client terminal may play different roles. Implementations are introduced below in detail from the perspective of the above three entities respectively.

Embodiment I

Figure 1:
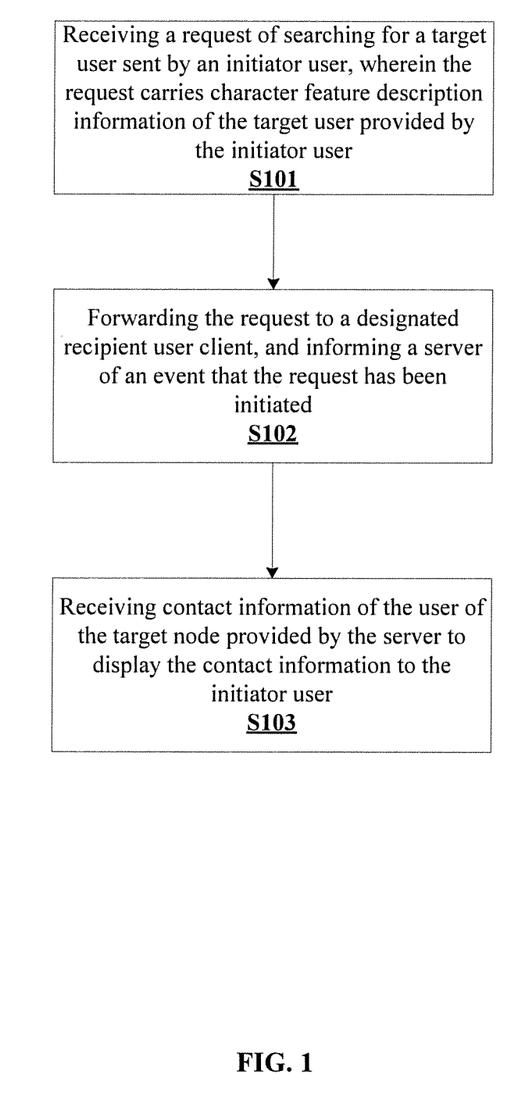
FIG. 1 is a flow chart of a first method, according to embodiments of the present disclosure.

Referring to FIG. 1, Embodiment I of the present disclosure provides a method for providing user information in an instant messaging application from the perspective of an initiator user client terminal, and the method may include the following steps S101-S103.

In S101, a request of searching for a target user sent by an initiator user may be received, wherein the request carries character feature description information of the target user provided by the initiator user.

For example, a component (e.g., a button) for initiating a request of searching for a target user may be provided on a user interface of a client terminal. Upon a user wanting to look for a target user, the user may initiate a request by the component. Correspondingly, the user becomes an initiator user and the client terminal where the user is located becomes an initiator user client terminal.

When a search request is initiated, an information input component, such as an input box, may also be provided to the initiator user, so that the initiator user provides character feature description information of the target user. It should be noted that, in the embodiments of the present disclosure, a target user that the initiator user is looking for may not be his/her friend, and the target user cannot be described with information such as a name, a user ID, and a nickname in an instant messaging system. Therefore, when character feature description information of the target user is provided, the target user may be described as a user in a category (e.g., a reporter, an editor, an actor, and the like that the initiator user is looking for). Region, gender, age, and the like may be further defined. Because the description information is mainly provided to recipient users, it is just required that the description information is understandable for users. For example, the target user may be described as "a chief editor of any fashion media in Hangzhou area."

In S102, the request may be forwarded to a designated recipient user client terminal, and a server is informed of an event that the request has been initiated, so that the server monitors and records a forwarding situation of the request, wherein at least one forwarding path is formed after the request is forwarded, each of the at least one forwarding path includes at least two nodes, each of the nodes corresponds to one user, users on adjacent nodes are in a preset relationship, and a starting node corresponds to the initiator user. The forwarding situation includes user identifiers corresponding to the nodes in the paths and processing mode information of the request. When a processing mode of a user on one forwarding path responds to the request, the user is determined as a target node of the forwarding path.

Moreover, contact information of the user of the starting node and the user of the target node may be provided to each other.

After receiving the request of the initiator user, the initiator user client terminal can forward the request to friend users of the initiator user. Meanwhile, the initiator user client terminal may notify a server of an event that the initiator user initiates the request, and the server monitors and records a forwarding situation of the request.

After one request is forwarded to friends of the initiator user, the friends can also forward the request to friends of the friends, and so on. Therefore, a plurality of forwarding paths may be formed. Each of the forwarding paths starts from the initiator user, a first-level intermediate node is a direct friend of the initiator user, a second-level intermediate node is a friend of the direct friend of the initiator user, and so on. Generally, in some instant messaging applications, strangers are allowed to communicate with each other. The so-called strangers are defined with respect to friends. For example, a user A knows the ID, the nickname and other information of a user B, and the user A may find the user B and talk to him/her, but the user A and the user B may not add each other as friends. Therefore, an intermediate node in each level may be any user that a user on an upper-level node thereof can contact, but may not necessarily be a friend thereof. However, each of the forwarding paths includes at least two nodes, each of the nodes corresponds to one user, and users on adjacent nodes are in a preset relationship (e.g., a friend relationship, a stranger relationship, and the like).

On each of the nodes, the request can be forwarded to a friend user designated by a user on the node. For example, when the request is forwarded to a recipient user, for example, by the initiator user client terminal, the initiator user may select one of his/her friend users as the recipient user. For example, the initiator user selects a friend that he/she believes can most likely contact the target user that he/she is looking for. Therefore, the initiator user client terminal may forward the request to the user selected by the initiator user from a list of friend users. Alternatively, the request may also be directly sent to all users in the list of friend users of the initiator user, and an object to which the request is forwarded to can also be selected for subsequent nodes in each level in a similar manner.

For example, a request forwarding process may be performed in a manner discussed below. For example, when a node needs to forward a request to a lower-level node, a client terminal of the node may forward the request to a lower-level node client terminal in a point-to-point manner. Generally, even if the point-to-point manner for forwarding a request is adopted, information regarding the forwarding (including user identifiers of a sender and a recipient, etc.) may also be sent to the server (however, at this point, the server is only responsible for recording information, but does not need to forward the request). Thus, the server may acquire information regarding a forwarding situation during the forwarding process. Alternatively, when a node needs to forward a request to a lower-level node thereof, the server may also be instructed to send the corresponding request to a designated lower-level node, and therefore, the lower-level node thereof can receive the related request from the server, and the server can naturally know the forwarding situation of the request.

The forwarding situation information (e.g., the information regarding the forwarding situation) may include user identifiers corresponding to the nodes in the paths and processing mode information of the request. For each recipient user, a processing mode may generally include two types, including continuously forwarding the request and responding to the request. During implementations, the recipient client terminal in each level may provide the corresponding recipient user with a processing mode selection component. For example, the processing mode selection component may include two buttons. One button may display words such as "Continuously Forward," and if a recipient user is not the one that the initiator user is looking for and is willing to help forward the request, the recipient user can click the button, and correspondingly, the server may record the processing mode of the recipient user as forwarding the request. The other button may display words such as "I am the one you are looking for," and if a recipient user believes that he/she is in line with character features described in the request, the recipient user can respond by clicking the button, and correspondingly, the server may record the processing mode of the recipient user as responding to the request. Moreover, the user can also be determined as a target user and a target node on the forwarding path where the user is located. Correspondingly, contact information of the user of the starting node and the user of the target node can be provided to each other, and then the two users can add each other as friends for communication.

Certainly, in order to avoid leakage of user information during the request forwarding process and also to enhance the entertainment during the whole process of looking for someone, users on nodes of each level may all send the request anonymously during the message forwarding process. That is, no recipient user knows who initiates the request of looking for someone at all. Once a user responds to the request, a forwarding path where the user is located becomes an effective path, and users corresponding to respective nodes on the path constitute an effective connection relationship. Therefore, the server may further provide all user information on respective intermediate nodes of the effective forwarding path to the initiator user and the target user, so that the two parties know they find each other through which users. In addition, the server may also provide information of the initiator user and the target user to users corresponding to respective intermediate nodes on the effective path.

For example, assuming the initiator user is a user A, after the user A initiates a search request, designated friend users include B1, B2, and B3. Therefore, three forwarding paths may be formed, and the user A is a starting node, and B1, B2, and B3 are intermediate nodes of the first level respectively for all of the three forwarding paths. Then, assuming B1 forwards the request to C1 and C2, B2 forwards the request to C3, C4, and C5, then C1 forwards the request to D1 and D2, C3 then forwards the request to D3, for example. Assuming D3 finally responds to the request, the forwarding path A-B2-C3-D3 where D3 is located is an effective path, and the server can establish a communication connection between A and D3. Moreover, B2 and C3 may also obtain the search result, and A and D3 may also know that they found each other through B2 and C3.

In S103, contact information of the user of the target node provided by the server may be received, so as to display the contact information to the initiator user.

After the initiator user client terminal receives contact information (e.g., an ID, a nickname, and the like) of the user of the target node provided by a recipient server, the contact information may be displayed to the initiator user, and the initiator user can add the user of the target node as a friend or directly initiate a conversation as a stranger, and the like, to finally enable the two parties to communicate with each other.

In summary, according to the embodiments of the present application, a user can find any user he/she wants to find in an instant messaging application via his/her friends, friends of the friends, and the like based on the theory of "six degrees of separation". Moreover, in the whole implementation process, a server may monitor and record a forwarding process of a request, and may directly provide information of a target user to an initiator user when the user makes a response. Therefore, the friends and intermediate node users including friends of the friends all only need to forward or respond to the request, and do not need to return a search result level-by-level. It may reduce workload of the intermediate node users, reduce a waste of system resources, and enable the initiator user to be notified of the search result more timely and more reliably.

Embodiment II

Figure 2:
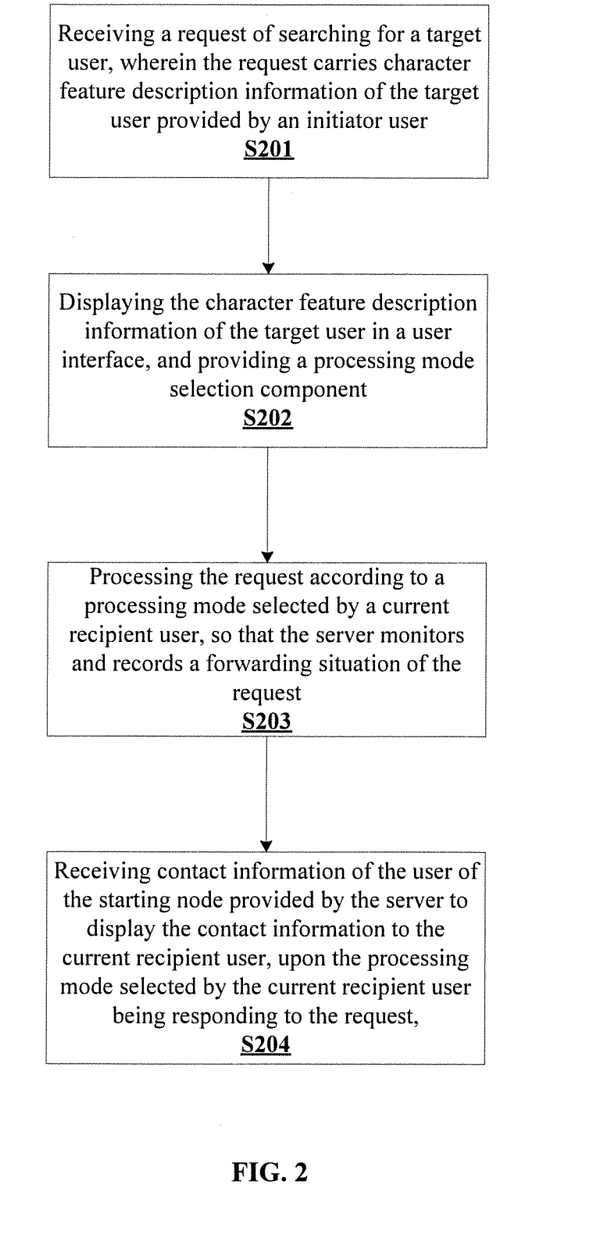
FIG. 2 is a flow chart of a second method, according to embodiments of the present disclosure.

Referring to FIG. 2, Embodiment II provides a method for providing user information in an instant messaging application from the perspective of a recipient client terminal, and the method may include the following steps of S201-S204.

S201: A request of searching for a target user may be received, wherein the request may carry character feature description information of the target user provided by an initiator user.

According to different request forwarding manners, the request received by the recipient client terminal may be from different sources. For example, if the request is sent in a point-to-point manner, the request can be directly received from the initiator client terminal or a recipient user client terminal of an upper-level node. However, if the request is sent in a manner of forwarding by the server, the request can be received from the server. Generally, no matter how the request is received, the server can monitor forwarding situation information.

In S202, the character feature description information of the target user may be displayed in a user interface, and a processing mode selection component may be provided;

After receiving the request, the recipient user may either continuously forward the request or respond to the request. In order to facilitate operations, in the embodiments of the present disclosure, a processing mode selection component, such as the two buttons described above, may be further provided to the recipient user while the character feature description information of the target user is displayed. Generally, in actual applications, the processing mode component may include a component for ignoring the request. For example, the component may display a word such as "Ignore." If the recipient user is not the one the user is looking for and does not want to forward the request, the recipient user can directly click the component to ignore the request.

In S203, the request may be processed according to a processing mode selected by a current recipient user, so that the server monitors and records a forwarding situation of the request, wherein at least one forwarding path is formed after the request is forwarded, each forwarding path includes at least two nodes, each of the nodes corresponds to one user, users on adjacent nodes are in a preset relationship, and a starting node corresponds to the initiator user. The forwarding situation includes user identifiers corresponding to the nodes in the paths and processing mode information about the request; and when a processing mode of a user on one forwarding path is responding to the request, the user is determined as a target node of the forwarding path.

Moreover, contact information of the user of the starting node and the user of the target node can be provided to each other.

In S204, if the processing mode selected by the current recipient user is responding to the request, contact information of the user of the starting node provided by the server is received, so as to display the contact information to the current recipient user.

In addition, if the processing mode selected by the current recipient user is continuously forwarding the request, the request can be forwarded to a designated recipient user, wherein the forwarding objects (e.g., the designated recipient user) may also be designated by the current recipient user, or all friends of the current recipient user may be directly used as the forwarding objects.

Moreover, if a node corresponding to the current recipient user is located on the forwarding path where the target node is located, the server may further provide user information of respective intermediate nodes on the forwarding path where the target node is located, and the recipient user client terminal may receive the user information of respective intermediate nodes on the forwarding path where the target node is located provided by the server, so as to display the user information to the current recipient user.

Embodiment III

Figure 3:
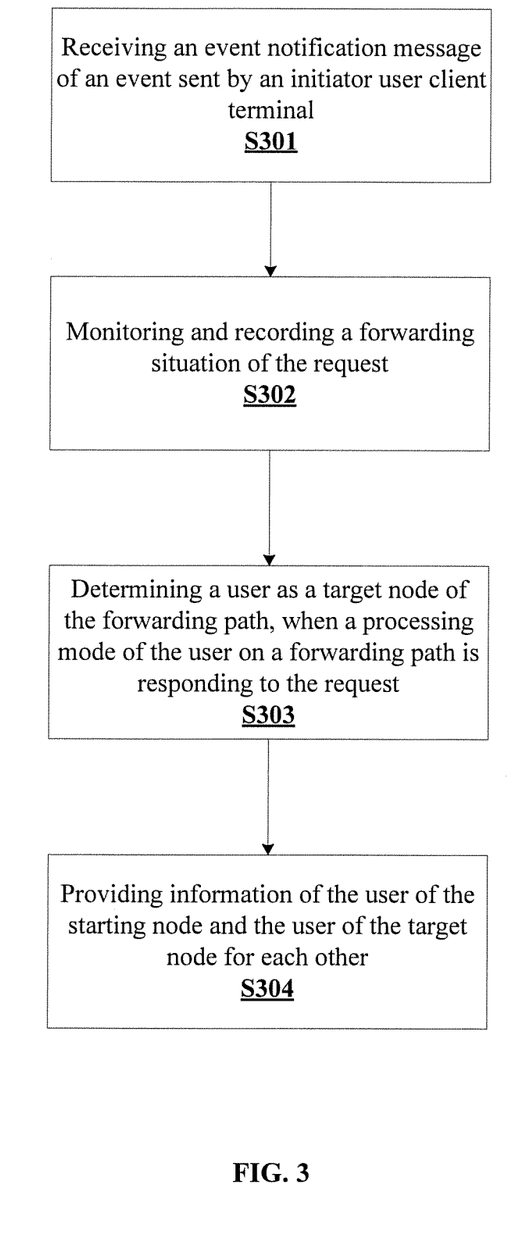
FIG. 3 is a flow chart of a third method, according to embodiments of the present disclosure.

Referring to FIG. 3, Embodiment III provides a method for providing user information in an instant messaging application mainly from the perspective of a server, and the method may include the following steps of S301-S304.

In S301, an event notification message of an event sent by an initiator user client terminal may be received, wherein the event includes the initiator user initiating a request of searching for a target user, the request carries character feature description information of the target user.

In S302, a forwarding situation of the request may be monitored and recorded, wherein at least one forwarding path is formed after the request is forwarded, each forwarding path includes at least two nodes, each of the nodes corresponds to one user, users on adjacent nodes are in a preset relationship, and a starting node corresponds to the initiator user. The forwarding situation includes user identifiers corresponding to the nodes in the paths and processing mode information of the request.

In S303, when a processing mode of a user on a forwarding path is responding to the request, the user may be determined as a target node of the forwarding path.

In S304, information of the user of the starting node and the user of the target node may be provided for each other.

During implementations, user information of intermediate nodes on the forwarding path where the target node is located may also be provided to the user of the starting node and the user of the target node. In addition, the user information of intermediate nodes on the forwarding path where the target node is located may also be provided to the users on the nodes of the forwarding path.

Compared with Embodiment I, Embodiments II and III are described from different perspectives, and detailed description may be referred to Embodiment I, the description of which is omitted herein.

Figure 4:
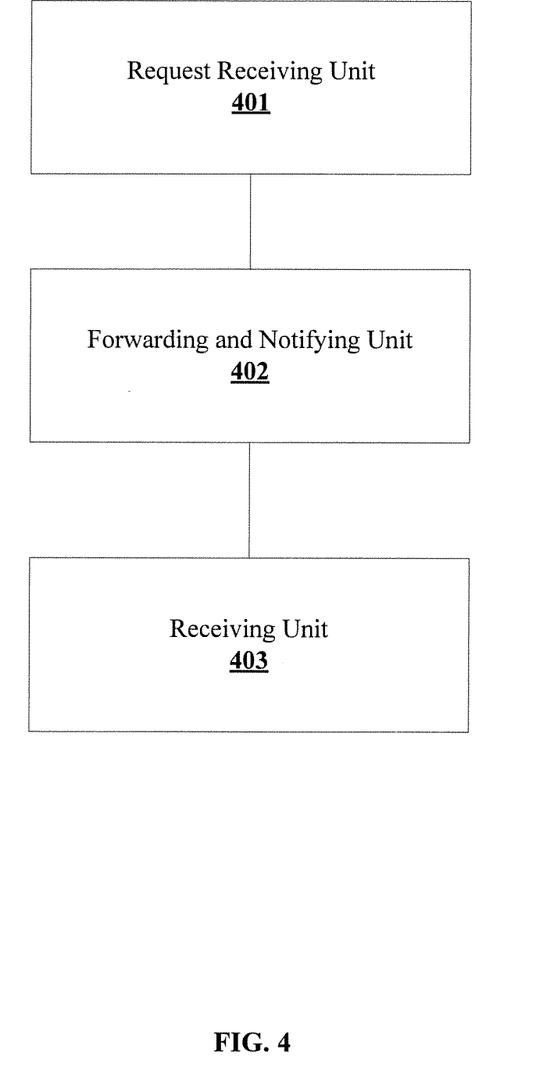
FIG. 4 is a schematic diagram of a first device according to embodiments of the present disclosure.

Corresponding to the method for providing user information in an instant messaging application provided in Embodiment I of the present disclosure, embodiments of the present disclosure further provides a device for providing user information in an instant messaging application. Referring to FIG. 4, the device may include a request receiving unit 401, a forwarding and notifying unit 402, and a receiving unit 403.

Request receiving unit 401 may be used for receiving a request of searching for a target user sent by an initiator user, the request carrying character feature description information of the target user provided by the initiator user.

Forwarding and notifying unit 402 may be used for forwarding the request to a designated recipient user client terminal, and notifying a server of an event that the request has been initiated, so that the server monitors and records a forwarding situation of the request, wherein at least one forwarding path is formed after the request is forwarded, each forwarding path includes at least two nodes, each of the nodes corresponds to one user, users on adjacent nodes are in a preset relationship, and a starting node corresponds to the initiator user. The forwarding situation includes user identifiers corresponding to the nodes in the paths and processing mode information of the request. And when a processing mode of a user on one forwarding path includes responding to the request, the user may be determined as a target node of the forwarding path. Contact information of the user of the starting node and the user of the target node may be provided to each other.

Receiving unit 403 may be used for receiving contact information of the user of the target node provided by the server, so as to display the contact information to the initiator user.

In one implementation, forwarding and notifying unit 402 may be further used for forwarding the request to a user selected by the initiator user from a list of friend users.

Alternatively, in another implementation, forwarding and notifying unit 402 is further used for forwarding the request to all users in a list of friend users of the initiator user.

In order to protect user privacy, forwarding and notifying unit 402 may be further used for forwarding the request to the designated recipient user anonymously.

If the server further provides user information of intermediate nodes on the forwarding path where the target node is located, receiving unit 403 may be further used for receiving the user information, provided by the server, of the intermediate nodes on the forwarding path where the target node is located, so as to display the user information to the initiator user.

Figure 5:
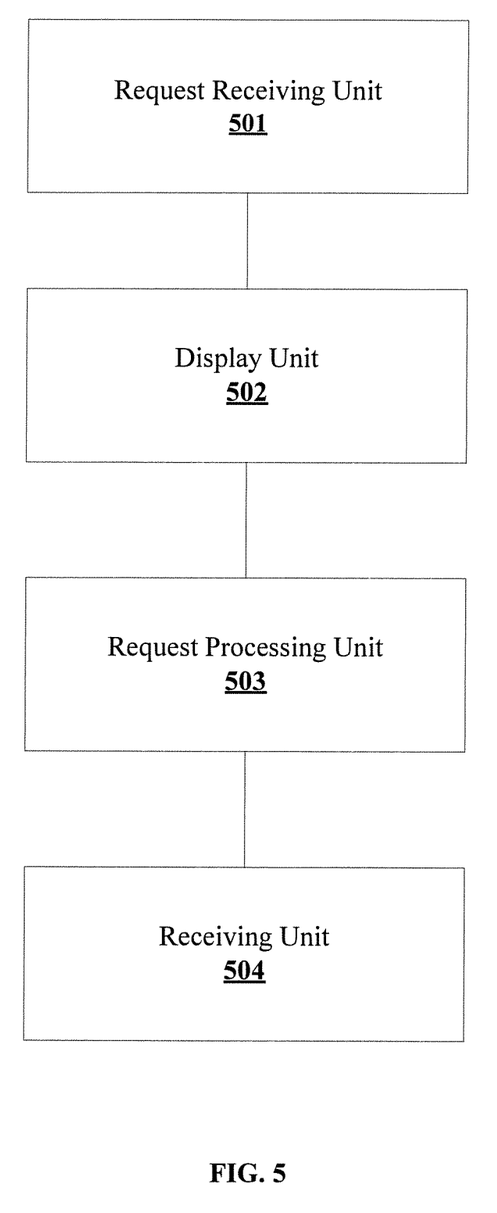
FIG. 5 is a schematic diagram of a second device according to embodiments of the present disclosure.

Corresponding to the method for providing user information in an instant messaging application provided in Embodiment II of the present disclosure, embodiments of the present disclosure further provides a device for providing user information in an instant messaging application. Referring to FIG. 5, the device may include a request receiving unit 501, a display unit 502, a request processing unit 503, and a receiving unit 504.

Request receiving unit 501 may be used for receiving a request of searching for a target user, the request carrying character feature description information of the target user provided by the initiator user.

Display unit 502 may be used for displaying the character feature description information of the target user in a user interface, and providing a processing mode selection component.

Request processing unit 503 may be used for processing the request according to a processing mode selected by a current recipient user, so that the server monitors and records a forwarding situation of the request, wherein at least one forwarding path is formed after the request is forwarded, each forwarding path includes at least two nodes, each of the nodes corresponds to one user, users on adjacent nodes are in a preset relationship, and a starting node corresponds to the initiator user. The forwarding situation includes user identifiers corresponding to the nodes in the paths and processing mode information of the request. And when a processing mode of a user on one forwarding path includes responding to the request, the user may be determined as a target node of the forwarding path. Contact information of the user of the starting node and the user of the target node may be provided to each other.

Receiving unit 504 may be used for, upon the processing mode selected by the current recipient user being responding to the request, receiving contact information of the user of the starting node provided by the server, so as to displaying the contact information to the current recipient user.

During one implementation, request processing unit 503 may further include:

a forwarding subunit used for, upon the processing mode selected by the current recipient user being continuously forwarding the request, forwarding the request to a designated recipient user.

If a node corresponding to the current recipient user is on the forwarding path where the target node is located, the server further provides user information of intermediate nodes on the forwarding path where the target node is located, and the receiving unit 504 may be further used for:

receiving the user information of the intermediate nodes on the forwarding path where the target node is located provided by the server, so as to display the user information to the current recipient user.

Figure 6:
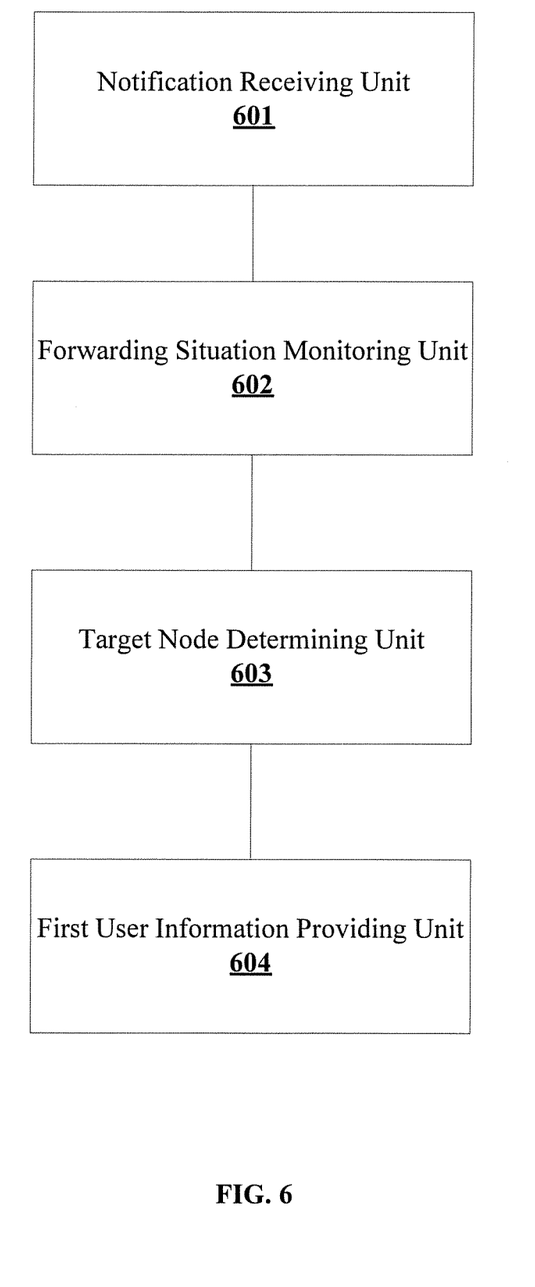
FIG. 6 is a schematic diagram of a third device, according to embodiments of the present disclosure.

Corresponding to the method for providing user information in an instant messaging application provided in Embodiment III of the present application, embodiments of the present disclosure further provides a device for providing user information in an instant messaging application. Referring to FIG. 6, the device may include a notification receiving unit 601, a forwarding situation monitoring unit 602, a target node determining unit 603, and a first user information providing unit 604.

Notification receiving unit 601 may be used for receiving an event notification message of an event sent by a client terminal of an initiator user, wherein the event includes the initiator user initiating a request of searching for a target user, the request carries character feature description information of the target user.

Forwarding situation monitoring unit 602 may be used for monitoring and recording a forwarding situation of the request, wherein at least one forwarding path is formed after the request is forwarded, each forwarding path includes at least two nodes, each of the nodes corresponds to one user, users on adjacent nodes are in a preset relationship, and a starting node corresponds to the initiator user. The forwarding situation includes user identifiers corresponding to the nodes in the paths and processing mode information of the request.

Target node determining unit 603 may be used for, upon a processing mode of a user on one forwarding path being responding to the request, determining the user as a target node of the forwarding path.

First user information providing unit 604 may be used for providing information of the user of the starting node and the user of the target node to each other.

During one implementation, the device may further include:

a second user information providing unit used for providing user information of respective intermediate nodes on the forwarding path where the target node is located to the user of the starting node and the user of the target node.

In addition, the device may further include:

a third user information providing unit used for providing user information of respective intermediate nodes on the forwarding path where the target node is located to users on the nodes of the forwarding path.

According to the embodiments of the present application, a user may find any user he/she wants to find in an instant messaging application via of his/her friends, friends of the friends, and the like based on the theory of "six degrees of separation". Moreover, in the whole implementation process, a server may monitor and record a forwarding process of a request, and may directly provide information of a target user to an initiator user when the user makes a response. Therefore, the friends and intermediate node users including friends of the friends all only need to forward or respond to the request, and do not need to return a search result level-by-level. It may reduce workload of the intermediate node users, reduce a waste of system resources, and enable the initiator user to be notified of the search result more timely and more reliably.

It can be known from the description of the above embodiments that, it is appreciated that the present disclosure may be implemented by means of software and necessary universal hardware platforms. Thus, the technical solution of the present disclosure essentially or the part thereof contributing to the prior art may be embodied as a software product. The computer software product may be stored in a storage medium, such as ROM/RAM, magnetic diskettes, compact discs, and the like, including several instructions to cause a computer apparatus (e.g., a personal computer, a server, a network device, and the like) to execute the method described in various embodiments or some of the embodiments of the present disclosure.

Various embodiments in the specification are all described in a progressive manner, same or similar parts among various embodiments may be referred with each other. For example, as for the system or system embodiments, the description thereof are relatively simple because they are basically as similar as the method embodiments, and the relevance therebetween can refer to the description of the method embodiments. The system and system embodiments described above are merely illustrative. Units described as separate components may or may not be separated physically. And components shown as units may or may not be physical units, for example, they can be located in one place or may be distributed on a plurality of network units. The objects of embodiments may be realized by selecting some or all modules according to actual needs. Those skilled in the art may understand and implement embodiments of the present disclosure without any inventive work.

Examples are described herein to illustrate the principles and implementations of the present disclosure. The description of the above embodiments is merely used for helping understand the methods and key concepts of the present disclosure. In the meantime, for a person skilled in the art, the particular implementation mode and application scope may be varied according to the concept of the present disclosure. In summary, the disclosure of the description shall not be construed as a limitation to the present disclosure.

What is claimed is:

1. A method for providing user information in an instant messaging application, comprising:
   receiving a request of searching for a target user sent by an initiator user, the request carrying character feature description information of the target user provided by the initiator user;
   forwarding the request to a designated recipient user client terminal;
   notifying a server the request has been initiated, wherein the notification causes the server to record and send forwarding information that includes:
      information associated with at least one forwarding path comprising at least two nodes, wherein:
         each node of the at least two nodes corresponds to one user,
         users on adjacent nodes are in a preset relationship, and
         the at least two nodes includes a starting node corresponding to the initiator user; and
      processing mode information corresponding to the at least two nodes, wherein the processing mode information indicates whether a node of the at least two nodes is a forwarding node or a target node, wherein the target node is determined based on a node of the forwarding path responding to the request; and
   receiving contact information of the user of the target node provided by the server for displaying the contact information to the initiator user.

2. The method according to claim 1, wherein forwarding the request to a designated recipient user further comprises:
   forwarding the request to a user selected, by the initiator user, from a list of friend users.

3. The method according to claim 1, wherein forwarding the request to a designated recipient user further comprises:
   forwarding the request to some or all users in a list of friend users of the initiator user.

4. The method according to claim 1, wherein forwarding the request to a designated recipient user further comprises:
   forwarding the request to the designated recipient user anonymously.

5. The method according to claim 1, further comprising:
   receiving, from the server, user information of intermediate nodes on the forwarding path where the target node is located, for displaying the user information to the initiator user.

6. A method for providing user information in an instant messaging application, comprising:
   receiving a request of searching for a target user, the request carrying character feature description information of the target user provided by an initiator user;
   displaying the character feature description information of the target user in a user interface, and providing a processing mode selection component;
   processing the request according to a processing mode selected by a current recipient user, wherein the processing causes the server to monitor and record forwarding information that includes
      information associated with at least one forwarding path formed according to the request, wherein:
         each of the at least one forwarding path comprises at least two nodes,
         each of the at least two nodes corresponds to one user,
         users on adjacent nodes are in a preset relationship, and
         a starting node of the at least two nodes corresponds to the initiator user; and
      processing mode information corresponding to the at least two nodes, wherein the processing mode information indicates whether a node of the at least two nodes is a forwarding node or a target node, wherein the target node is determined based on a node of the forwarding path responding to the request; and
   after the processing mode is selected by the current recipient user being responding to the request, receiving contact information of the user of the starting node provided by the server, for displaying the contact information to the current recipient user.

7. The method according to claim 6, wherein processing the request according to a processing mode selected by a current recipient user comprises:
   after the processing mode is selected by the current recipient user being continuously forwarding the request, forwarding the request to a designated recipient user.

8. The method according to claim 6, further comprising:
   receiving, from the server, user information of intermediate nodes on the forwarding path where the target node is located, for displaying the user information to the current recipient user.

9. A method for providing user information in an instant messaging application, comprising:
   receiving an event notification message of an event sent by a client terminal of an initiator user, the event being that the initiator user has initiated a request of searching for a target user, the request carrying character feature description information of the target user;
   monitoring and recording forwarding information that includes:
      information associated with at least one forwarding path comprising at least two nodes, wherein:
         each node of the at least two nodes corresponds to one user,
         users on adjacent nodes are in a preset relationship, and
         the at least two nodes includes a starting node corresponding to the initiator user; and
      processing mode information corresponding to the at least two nodes, wherein the processing mode information indicates whether a node of the at least two nodes is a forwarding node or a target node, wherein the target node is determined based on a node of the forwarding path responding to the request; and
   after a processing mode of a user on one forwarding path responds to the request, determining the user as the target node of the forwarding path; and
   providing information of the user of the starting node and the user of the target node for each other.

10. The method according to claim 9, further comprising:
    providing user information of intermediate nodes on the forwarding path where the target node is located for the user of the starting node and the user of the target node.

11. The method according to claim 9, further comprising:
    providing user information of intermediate nodes on the forwarding path where the target node is located for users on the nodes of the forwarding path.

12. A device for providing user information in an instant messaging application, comprising:
a request receiving unit used for receiving a request of searching for a target user sent by an initiator user, the request carrying character feature description information of the target user provided by the initiator user;
a forwarding and notifying unit used for forwarding the request to a designated recipient user client terminal, and notifying a server of the request has been initiated, wherein the notification causes the server to record and send forwarding information that includes:
information associated with at least one forwarding path comprising at least two nodes, wherein:
each node of the at least two nodes corresponds to one user,
users on adjacent nodes are in a preset relationship, and
the at least two nodes includes a starting node corresponding to the initiator user; and
processing mode information corresponding to the at least two nodes, wherein the processing mode information indicates whether a node of the at least two nodes is a forwarding node or a target node, wherein the target node is determined based on a node of the forwarding path responding to the request; and
a receiving unit used for receiving contact information of the user of the target node provided by the server for displaying the contact information to the initiator user.

13. The device according to claim 12, wherein the forwarding and notifying unit is further used for:
forwarding the request to a user selected, by the initiator user, from a list of friend users.

14. The device according to claim 12, wherein the forwarding and notifying unit is further used for:
forwarding the request to some or all users in a list of friend users of the initiator user.

15. The device according to claim 12, wherein the forwarding and notifying unit is further used for:
forwarding the request to the designated recipient user anonymously.

16. The device according to claim 12, wherein the receiving unit is further used for:
receiving, from the server, user information of intermediate nodes on the forwarding path where the target node is located, for displaying the user information to the initiator user.

17. A device for providing user information in an instant messaging application, comprising:
a request receiving unit used for receiving a request of searching for a target user, the request carrying character feature description information of the target user provided by an initiator user;
a display unit used for displaying the character feature description information of the target user in a user interface, and providing a processing mode selection component;
a request processing unit used for processing the request according to a processing mode selected by a current recipient user, wherein the processing causes the server to record and send forwarding information that includes:
information associated with at least one forwarding path comprising at least two nodes, wherein:
each node of the at least two nodes corresponds to one user,
users on adjacent nodes are in a preset relationship, and
the at least two nodes includes a starting node corresponding to the initiator user; and
processing mode information corresponding to the at least two nodes, wherein the processing mode information indicates whether a node of the at least two nodes is a forwarding node or a target node, wherein the target node is determined based on a node of the forwarding path responding to the request; and
a receiving unit used for, after the processing mode is selected by the current recipient user being responding to the request, receiving contact information of the user of the starting node provided by the server, for displaying the contact information to the current recipient user.

18. The device according to claim 17, wherein the request processing unit comprises:
a forwarding subunit used for, after the processing mode is selected by the current recipient user being continuously forwarding the request, forwarding the request to a designated recipient user.

19. The device according to claim 17, wherein the receiving unit is further used for:
receiving, from the server, user information of intermediate nodes on the forwarding path where the target node is located, so as to display the user information to the current recipient user.

20. A device for providing user information in an instant messaging application, comprising:
a notification receiving unit used for receiving an event notification message of an event sent by a client of an initiator user, the event being that the initiator user has initiated a request of searching for a target user, the request carrying character feature description information of the target user;
a forwarding situation monitoring unit used for recording and sending forwarding information that includes:
information associated with at least one forwarding path comprising at least two nodes, wherein:
each node of the at least two nodes corresponds to one user,
users on adjacent nodes are in a preset relationship, and
the at least two nodes includes a starting node corresponding to the initiator user; and
processing mode information corresponding to the at least two nodes, wherein the processing mode information indicates whether a node of the at least two nodes is a forwarding node or a target node, wherein the target node is determined based on a node of the forwarding path responding to the request
a target node determining unit used for, after a processing mode of a user on one forwarding path responds to the request, determining the user as the target node of the forwarding path; and
a first user information providing unit used for providing information of the user of the starting node and the user of the target node to each other.

21. The device according to claim 20, further comprising:
a second user information providing unit used for providing user information of intermediate nodes on the forwarding path where the target node is located to the user of the starting node and the user of the target node.

22. The device according to claim 20, further comprising:
a third user information providing unit used for providing user information of respective intermediate nodes on the forwarding path where the target node is located to users on the nodes of the forwarding path.

23. A non-transitory computer readable medium that stores a set of instructions that is executable by at least one processor of a device for providing user information in an instant messaging application to cause the device to perform a method for providing user information in an instant messaging application, the method comprising:
  receiving a request of searching for a target user sent by an initiator user, the request carrying character feature description information of the target user provided by the initiator user;
  forwarding the request to a designated recipient user client terminal;
  notifying a server the request has been initiated, wherein the notification causes the server to record and send forwarding information that includes:
    information associated with at least one forwarding path comprising at least two nodes, wherein:
      each node of the at least two nodes corresponds to one user,
      users on adjacent nodes are in a preset relationship, and
      the at least two nodes includes a starting node corresponding to the initiator user; and
    processing mode information corresponding to the at least two nodes, wherein the processing mode information indicates whether a node of the at least two nodes is a forwarding node or a target node, wherein the target node is determined based on a node of the forwarding path responding to the request; and
  receiving contact information of the user of the target node provided by the server for displaying the contact information to the initiator user.

24. The non-transitory computer readable medium according to claim 23, wherein the set of instructions is executable by the at least one processor of the device to cause the device to further perform forwarding the request to a designated recipient user by:
  forwarding the request to a user selected, by the initiator user, from a list of friend users.

25. The non-transitory computer readable medium according to claim 23, wherein the set of instructions is executable by the at least one processor of the device to cause the device to further perform forwarding the request to a designated recipient user by:
  forwarding the request to some or all users in a list of friend users of the initiator user.

26. The non-transitory computer readable medium according to claim 23, wherein the set of instructions is executable by the at least one processor of the device to cause the device to further perform forwarding the request to a designated recipient user by:
  forwarding the request to the designated recipient user anonymously.

27. The non-transitory computer readable medium according to claim 23, wherein the set of instructions is executable by the at least one processor of the device to cause the device to further perform:
  receiving, from the server, user information of intermediate nodes on the forwarding path where the target node is located, so as to display the user information to the initiator user.

28. A non-transitory computer readable medium that stores a set of instructions that is executable by at least one processor of a device for providing user information in an instant messaging application to cause the device to perform a method for providing user information in an instant messaging application, the method comprising:
  receiving a request of searching for a target user, the request carrying character feature description information of the target user provided by an initiator user;
  displaying the character feature description information of the target user in a user interface, and providing a processing mode selection component;
  processing the request according to a processing mode selected by a current recipient user and sending forwarding information to a server, wherein the forwarding information includes:
    information associated with at least one forwarding path comprising at least two nodes, wherein:
      each node of the at least two nodes corresponds to one user,
      users on adjacent nodes are in a preset relationship, and
      the at least two nodes includes a starting node corresponding to the initiator user; and
    processing mode information corresponding to the at least two nodes, wherein the processing mode information indicates whether a node of the at least two nodes is a forwarding node or a target node, wherein the target node is determined based on a node of the forwarding path responding to the request; and
  after the processing mode is selected by the current recipient user being responding to the request, receiving contact information of the user of the starting node provided by the server, for displaying the contact information to the current recipient user.

29. The non-transitory computer readable medium according to claim 28, wherein the set of instructions is executable by the at least one processor of the device to cause the device to further perform processing the request according to a processing mode selected by a current recipient user by:
  upon the processing mode selected by the current recipient user being continuously forwarding the request, forwarding the request to a designated recipient user.

30. The non-transitory computer readable medium according to claim 28, wherein the set of instructions is executable by the at least one processor of the device to cause the device to further perform:
  receiving, from the server, user information of intermediate nodes on the forwarding path where the target node is located, so as to display the user information to the current recipient user.

31. A non-transitory computer readable medium that stores a set of instructions that is executable by at least one processor of a device for providing user information in an instant messaging application to cause the device to perform a method for providing user information in an instant messaging application, the method comprising:
  receiving an event notification message of an event sent by a client terminal of an initiator user, the event being that the initiator user has initiated a request of searching for a target user, the request carrying character feature description information of the target user;
  recording forwarding information that includes:
    information associated with at least one forwarding path comprising at least two nodes, wherein:
      each node of the at least two nodes corresponds to one user,
      users on adjacent nodes are in a preset relationship, and
      the at least two nodes includes a starting node corresponding to the initiator user; and processing mode information corresponding to the at least two nodes, wherein the processing mode information indicates whether a node of the at least two nodes is a forwarding node or a target node, wherein the target node is determined based on a node of the forwarding path responding to the request;

after a processing mode of a user on one forwarding path responds to the request, determining the user as the target node of the forwarding path; and providing information of the user of the starting node and the user of the target node for each other.

32. The non-transitory computer readable medium according to claim 31, wherein the set of instructions is executable by the at least one processor of the device to cause the device to further perform:

providing user information of intermediate nodes on the forwarding path where the target node is located for the user of the starting node and the user of the target node.

33. The non-transitory computer readable medium according to claim 31, wherein the set of instructions is executable by the at least one processor of the device to cause the device to further perform:

providing user information of intermediate nodes on the forwarding path where the target node is located for users on the nodes of the forwarding path.

* * * * *

UNITED STATES PATENT AND TRADEMARK OFFICE
CERTIFICATE OF CORRECTION

PATENT NO. : 10,320,720 B2
APPLICATION NO. : 15/520833
DATED : June 11, 2019
INVENTOR(S) : Shuyan Liu It is certified that error appears in the above-identified patent and that said Letters Patent is hereby corrected as shown below:

On the Title Page

Item (30), "2014 1 0559409" should read as --201410559409.7--

Signed and Sealed this
Tenth Day of September, 2019

Andrei Iancu
*Director of the United States Patent and Trademark Office*